US012717215B2

(12) United States Patent
Chao et al.

(10) Patent No.: US 12,717,215 B2
(45) Date of Patent: Aug. 25, 2026

(54) OPTICAL SYSTEM

(71) Applicant: Actutek Corporation, Taoyuan City (TW)

(72) Inventors: Chen-Hung Chao, Taoyuan City (TW); Po-Xiang Zhuang, Taoyuan City (TW); Chao-Chang Hu, Taoyuan City (TW); Yi-Ho Chen, Taoyuan City (TW); Wei-Jhe Shen, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 370 days.

(21) Appl. No.: 18/501,787

(22) Filed: Nov. 3, 2023

(65) Prior Publication Data

US 2024/0152035 A1 May 9, 2024

Related U.S. Application Data

(60) Provisional application No. 63/446,562, filed on Feb. 17, 2023, provisional application No. 63/422,734, filed on Nov. 4, 2022.

(51) Int. Cl.
*G03B 9/22* (2021.01)
*G03B 9/18* (2021.01)

(52) U.S. Cl.
CPC ................ *G03B 9/22* (2013.01); *G03B 9/18* (2013.01)

(58) Field of Classification Search
USPC ........................................................ 359/896
See application file for complete search history.

(56) References Cited

U.S. PATENT DOCUMENTS

2021/0132328 A1* 5/2021 Hu ...................... G02B 27/646
2022/0221625 A1* 7/2022 Weng ...................... G03B 5/00

* cited by examiner

*Primary Examiner* — Dung T Nguyen
(74) *Attorney, Agent, or Firm* — MUNCY, GEISSLER, OLDS & LOWE, P.C.

(57) ABSTRACT

An optical system is provided, including a fixed part, a movable part, and a driving assembly. The fixed part has an opening. A light passes through the opening. The movable part is movable relative to the fixed part and connected to a first optical element. The driving assembly drives the movable part to move relative to the fixed part. The first optical element at least partially overlaps the opening when the movable part is in a first position. The first optical element further includes a first optical element surface, and the first optical element surface faces the light.

18 Claims, 8 Drawing Sheets

OPTICAL SYSTEM

CROSS REFERENCE TO RELATED APPLICATIONS

This application claims the benefit of U.S. Provisional Application No. 63/422,734, filed Nov. 4, 2022, and U.S. Provisional Application No. 63/446,562, filed Feb. 17, 2023, the entirety of which are incorporated by reference herein.

BACKGROUND OF THE INVENTION

Field of the Invention

The present disclosure relates to an optical system, and more particularly, the present disclosure relates to an optical system for an electronic device.

Description of the Related Art

As the relevant technologies have been developed, many electronic devices (such as computers and tablets) are equipped with the capability to record images and videos. However, when an optical element (such as lens) having a long focal length is provided in an electronic device, the thickness of the electronic device may be increased, impeding the prospects for miniaturization of the electronic device. Therefore, how to design an optical system and an optical device that may miniaturize the electronic device has become an important issue.

BRIEF SUMMARY OF THE INVENTION

To solve the problems of the prior art, an optical system is provided, including a fixed part, a movable part, and a driving assembly. The fixed part has an opening. A light passes through the opening. The movable part is movable relative to the fixed part and connected to a first optical element. The driving assembly drives the movable part to move relative to the fixed part. The first optical element at least partially overlaps the opening when the movable part is in a first position. The first optical element further includes a first optical element surface, and the first optical element surface faces the light.

In one of the embodiments of the present disclosure, the first optical element does not overlap the opening when the movable part is in a second position.

In one of the embodiments of the present disclosure, the driving assembly includes a driving coil and a magnetic element. A magnetic element surface of the magnetic element faces the driving coil, and the magnetic element surface is parallel to the traveling direction of the light.

In one of the embodiments of the present disclosure, the driving assembly further includes a magnetic conductive element corresponding to the magnetic element to generate an attraction force. The magnetic conductive element is fixed on the fixed part, the magnetic conductive element is in contact with the driving coil, and the magnetic conductive element is in an L shape. The magnetic conductive element at least partially overlaps the magnetic element when viewed along the traveling direction of the light.

In one of the embodiments of the present disclosure, the optical system further includes a supporting assembly disposed between the fixed part and the movable part. The supporting assembly includes a first supporting element, and the first supporting element abuts the fixed part and the movable part.

In one of the embodiments of the present disclosure, the first supporting element includes a first supporting element center. The angle between the first line segment formed by the first supporting element center and a movable part center of the movable part and the attraction force is greater than 30 degrees.

In one of the embodiments of the present disclosure, the angle between the first line segment and the attraction force is greater than 45 degrees.

In one of the embodiments of the present disclosure, the first supporting element is disposed in an accommodation space formed by a V-shaped groove of the fixed part and a movable part outer surface of the movable part. The movable part outer surface is an arc with a movable part center of the movable part as the center. The first supporting element abuts the movable part outer surface.

In one of the embodiments of the present disclosure, the movable part further includes a movable part stopping structure extending from the movable part outer surface toward the fixed part.

In one of the embodiments of the present disclosure, the V-shaped groove includes a V-shaped groove first surface. The first supporting element abuts the V-shaped groove first surface. An angle between an extended line segment of the V-shaped groove first surface and the attraction force is between 75 degrees and 105 degrees.

In one of the embodiments of the present disclosure, the V-shaped groove further includes a V-shaped groove second surface. The first supporting element abuts the V-shaped groove second surface. An angle between the extended line segment of the V-shaped groove first surface and the extended line segment of the V-shaped groove second surface is between 80 degrees and 100 degrees.

In one of the embodiments of the present disclosure, the V-shaped groove further includes a V-shaped groove recess, the V-shaped groove recess is recessed downward along the traveling direction of the light to accommodate the first supporting element.

In one of the embodiments of the present disclosure, the optical system further includes a lubricating element disposed adjacent to the first supporting element. The V-shaped groove recess further accommodates the lubricating element.

In one of the embodiments of the present disclosure, the V-shaped groove further includes a bevel structure. The bevel structure is away from the V-shaped groove first surface and the V-shaped groove second surface, and the bevel structure is disposed at the edge of the V-shaped groove recess. The bevel structure extends obliquely upward from the V-shaped groove recess.

In one of the embodiments of the present disclosure, the supporting assembly includes a second supporting element. A first supporting element center of the first supporting element and a movable part center of the movable part form a first line segment. A second supporting element center of the second supporting element and the movable part center form a second line segment. An angle between the first line segment and the second line segment is 180 degrees.

In one of the embodiments of the present disclosure, the supporting assembly further includes a second supporting element, a third supporting element, and a fourth supporting element. A first supporting element center of the first supporting element and a movable part center of the movable part form a first line segment. A second supporting element center of the second supporting element and the movable part center form a second line segment. A third supporting element center of the third supporting element and the movable part center form a third line segment. A fourth supporting element center of the fourth supporting element and the movable part center form a fourth line segment. The first line segment, the second line segment, the third line segment, and the fourth line segment are spaced apart by 90 degrees, respectively.

In one of the embodiments of the present disclosure, the second supporting element abuts the fixed part and the movable part. The third supporting element and the fourth supporting element do not abut the fixed part and the movable part.

In one of the embodiments of the present disclosure, the first supporting element is disposed in an accommodation space formed by a fixed part inner surface of the fixed part and a V-shaped groove of the movable part. The fixed part inner surface is an arc with a center fixed part of the fixed part as the center. The first supporting element abuts the fixed part inner surface.

In one of the embodiments of the present disclosure, the V-shaped groove includes a V-shaped groove first surface. The first supporting element abuts the V-shaped groove first surface. An angle between an extended line segment of the V-shaped groove first surface and the attraction force is between 75 degrees and 105 degrees.

In one of the embodiments of the present disclosure, the fixed part further includes a fixed part stopping structure extending from the fixed part inner surface toward the movable part.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

The making and using of optical systems of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

It should be noted that the technical solutions provided by different embodiments below may be interchangeable, combined or mixed to form another embodiment without departing from the spirit of the present disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The scale of the drawings in the present disclosure may be drawn according to the actual size. The scale of the same figure in the present disclosure can be used as the actual manufacturing scale of the devices, equipment, elements, etc. of the present disclosure. It should be noted that each figure may be drawn at different orientations, which may result in different size ratios among different figures. However, the size ratio shown in an individual figure is not affect by the different size ratios between different figures. People with ordinary skill in the art can understand that the size ratio of the figures in the present disclosure can be used as a distinguishing feature from the prior art.

Figure 1:
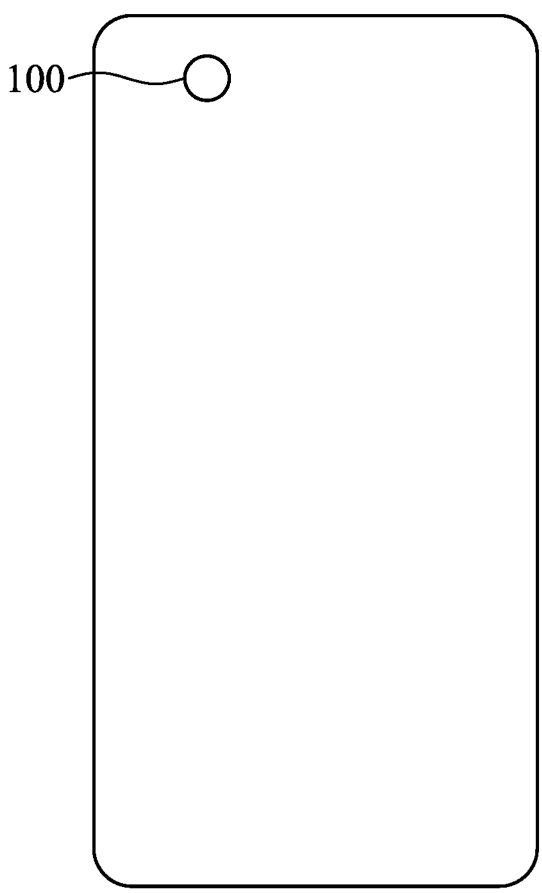
FIG. 1 is a schematic view of an electrical device according to some embodiment of the present disclosure.

Firstly, please refer to FIG. 1, FIG. 1 is a schematic view of an electrical device 1 according to some embodiment of the present disclosure. As shown in FIG. 1, an optical system 100 of some embodiment of the present disclosure may be mounted in an electrical device 1 for taking photos or videos, wherein the aforementioned electrical device 1 may, for example, be a smartphone or a digital camera, but the present disclosure is not limited to these. It should be noted that the position and the size between the optical system 100 and the electrical device 1 shown in FIG. 1 are only an example, which is not for limiting the position and the size between the optical system 100 and the electrical device 1. In fact, according to different needs, the optical system 100 may be mounted at different positions in the electrical device 1.

Figure 2:
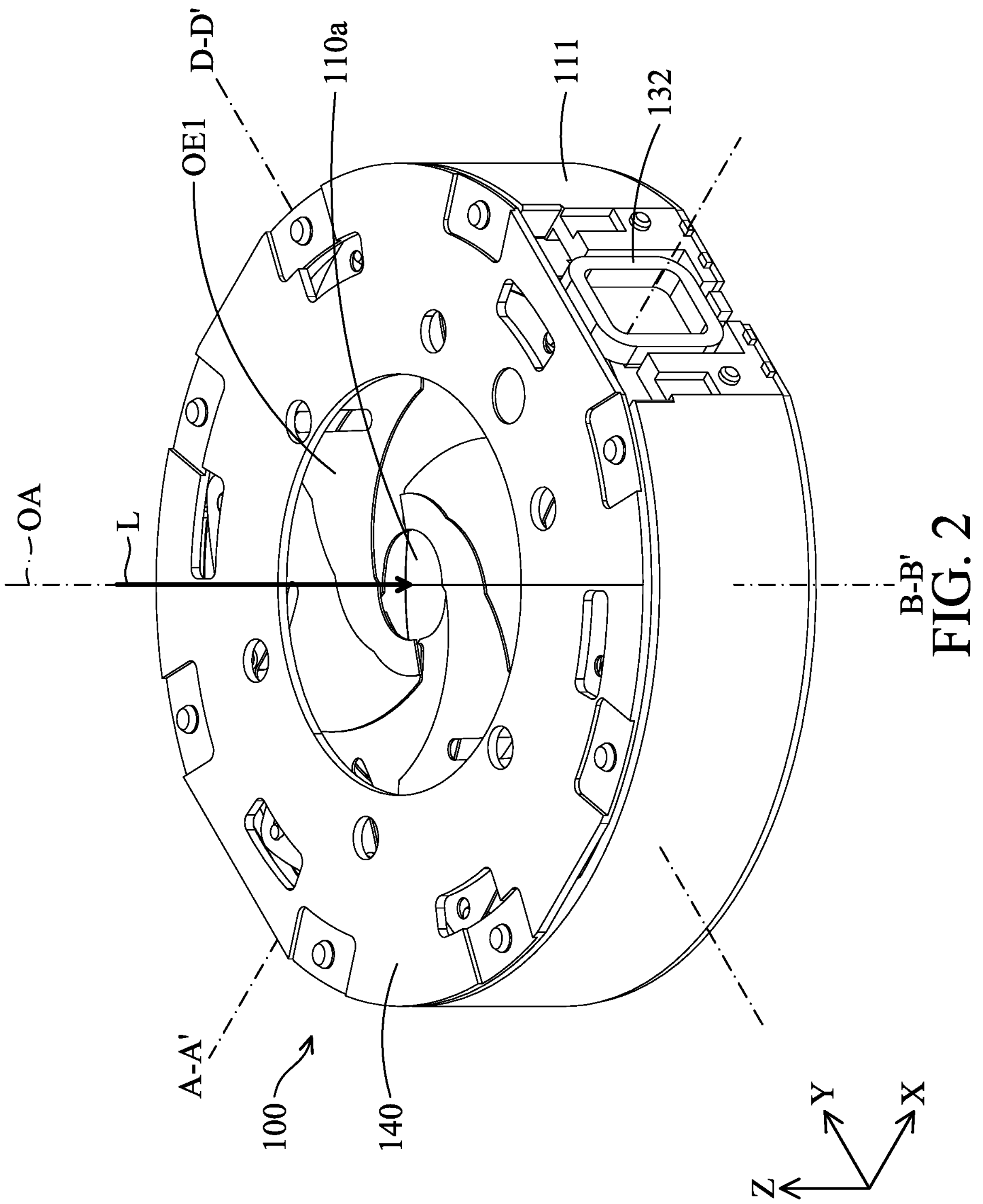
FIG. 2 is a schematic view of the optical system and the first optical element OE1 according to some embodiments of the present disclosure.
Figure 3:
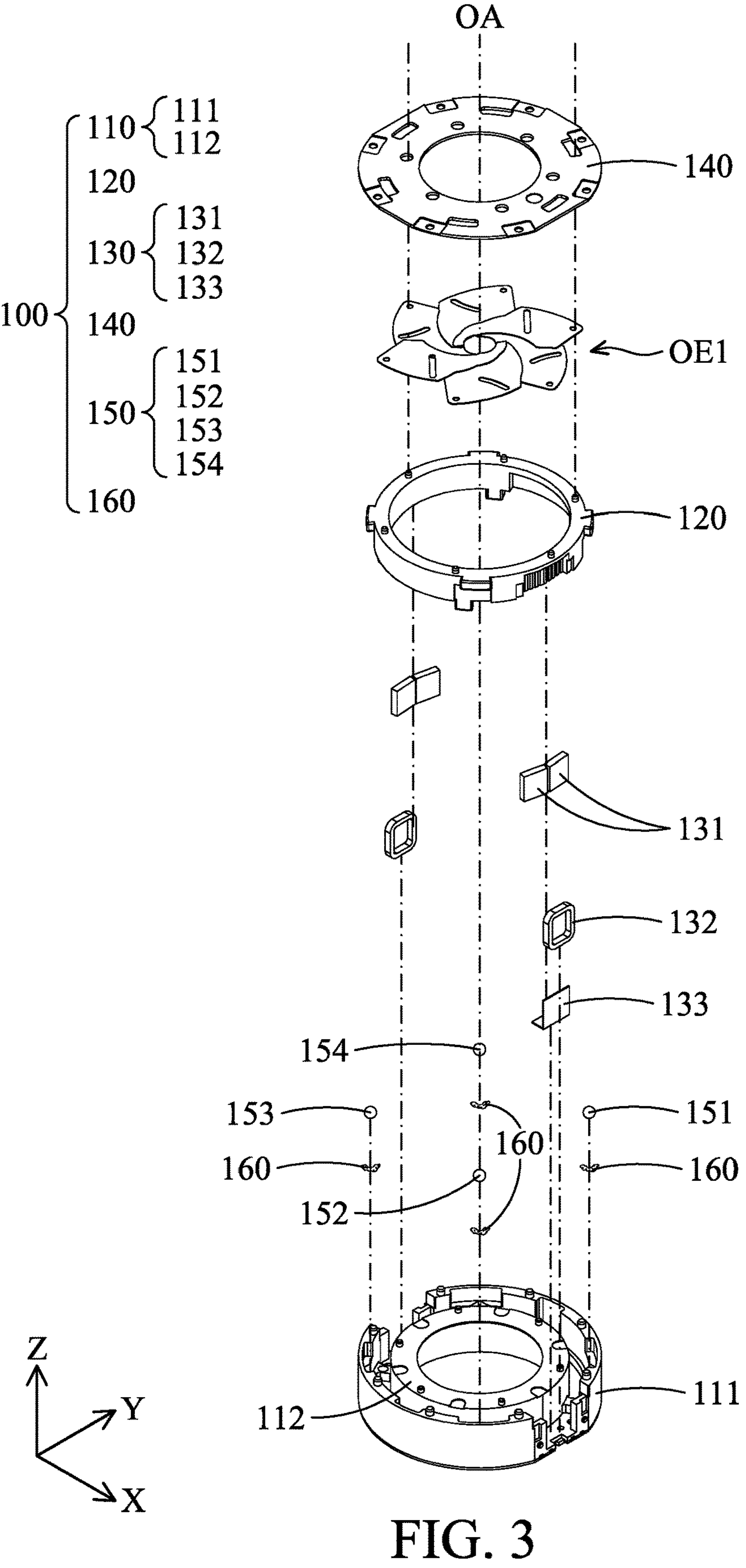
FIG. 3 is an exploded view of the optical system and the first optical element OE1 according to some embodiments of the present disclosure.

Please refer to FIG. 2 and FIG. 3. FIG. 2 is a schematic view of the optical system 100 and the first optical element OE1 according to some embodiments of the present disclosure. FIG. 3 is an exploded view of the optical system 100 and the first optical element OE1 according to some embodiments of the present disclosure.

The optical system 100 may include a fixed part 110, a movable part 120, a driving assembly 130, a protective assembly 140, a supporting assembly 150, and a lubricating element 160.

The fixed part 110 may include an outer frame 111 and a base 112. The outer frame 111 and the base 112 may be connected to each other and form an internal space to accommodate other elements of the optical system 100 or the first optical element OE1.

The fixed part 110 may further include an opening 110*a*, and a light L may pass through the opening 110*a*, so that the light L may be incident into the optical system 100 from the outside. Moreover, the light L may reach a second optical element OE2 (not shown).

According to some embodiments of the present disclosure, the first optical element OE1 may be a blade, a filter element, a light-shielding element, or a lens. According to some embodiments of the present disclosure, the second optical element OE2 may be a lens, a photosensitive element, or the like.

According to a more common embodiment of the present disclosure, the first optical element OE1 may be a light-shielding element, and the second optical element OE2 may be a lens.

The movable part 120 may be connected to the first optical element OE1, and the movable part 120 may move relative to the fixed part 110. For example, the movable part 120 may move around an optical axis OA relative to the fixed part 110, and the first optical element OE1 may move around the optical axis OA with the movable part 120 relative to the fixed part 110.

The driving assembly 130 may drive the movable part 120 to move relative to the fixed part 110. The driving assembly 130 may include a magnetic element 131, a driving coil 132, and a magnetic conductive element 133.

According to some embodiments of the present disclosure, the magnetic element 131 may be disposed on the movable part 120, and the driving coil 132 may be disposed on the fixed part 110 to drive the movable part 120 to move relative to the fixed part 110.

Figure 4:
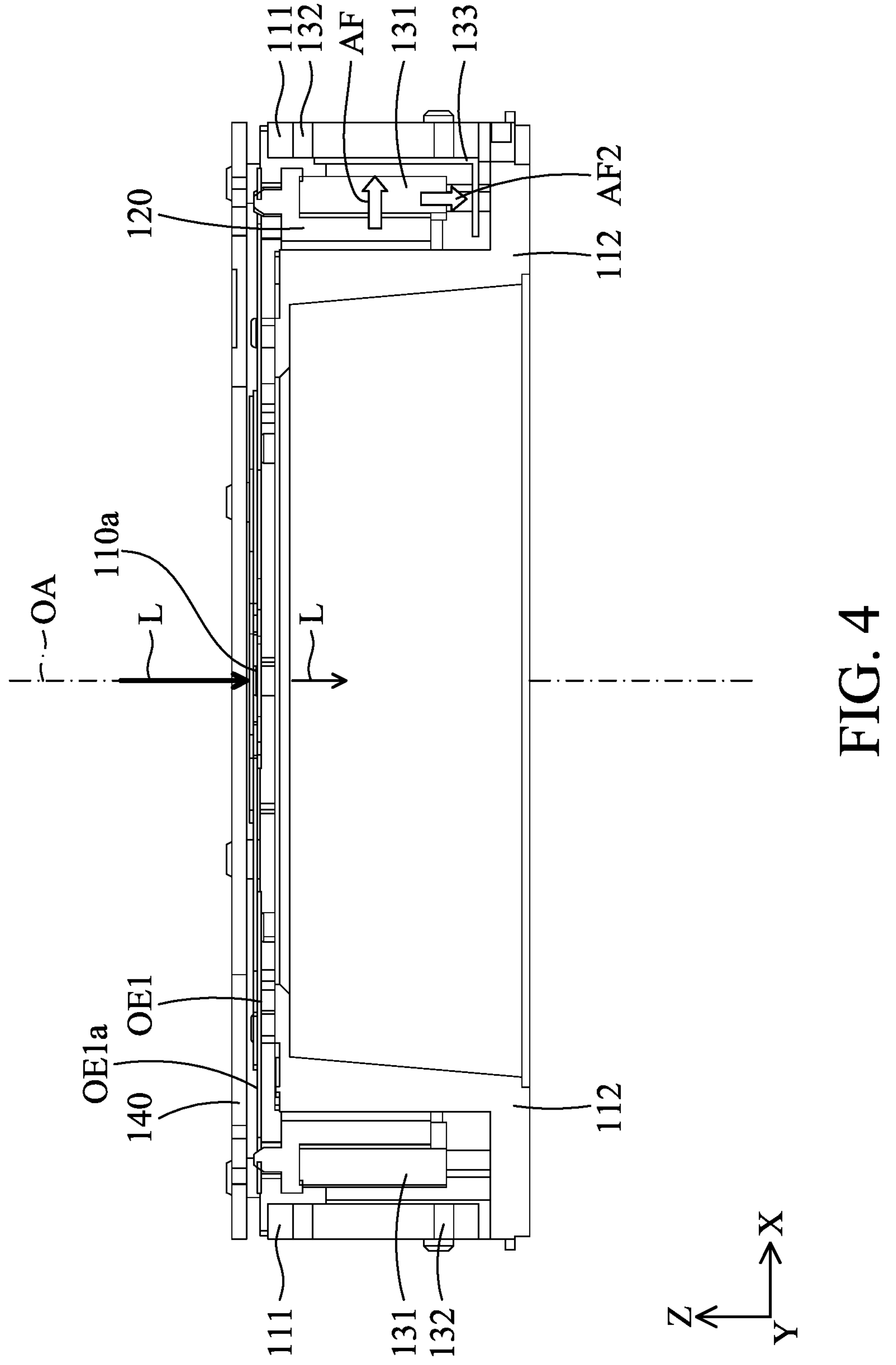
FIG. 4 is a cross-sectional view along line A-A' of FIG. 2 of the optical system and the first optical element according to some embodiments of the present disclosure, in which the first optical element and the fixed part at least partially overlap the openings.
Figure 5:
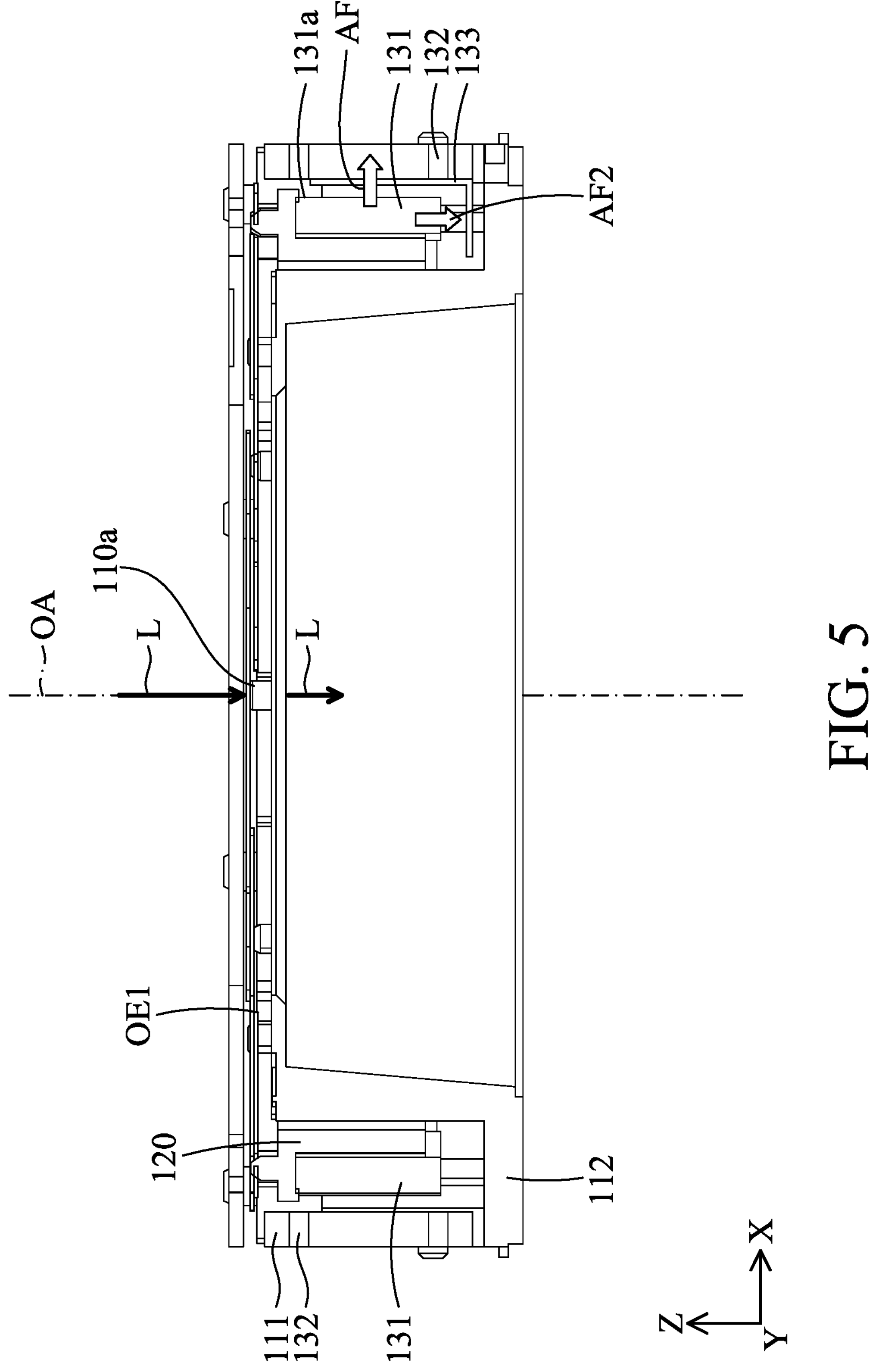
FIG. 5 is a cross-sectional view along line A-A' of FIG. 2 of the optical system and the first optical element according to some embodiments of the present disclosure, in which the first optical element and the fixed part do not overlap the openings.

The magnetic conductive element 133 may be disposed adjacent to the magnetic element 131, so that an attraction force AF may be generated between the magnetic element 131 and the magnetic conductive element 133 (see FIG. 4 or FIG. 5).

The protective assembly 140 may have a plate-like structure and a substantially annular structure. The protective assembly 140 may have a plate-like structure and a substantially annular structure, and the protective assembly 140 may be disposed above the first optical element OE1 to prevent unwanted foreign matter from entering the optical system 100.

The supporting assembly 150 may be disposed between the fixed part 110 and the movable part 120 to avoid direct friction between the fixed part 110 and the movable part 120.

Please refer to FIG. 4. FIG. 4 is a cross-sectional view along line A-A' of FIG. 2 of the optical system 100 and the first optical element OE1 according to some embodiments of the present disclosure, in which the first optical element OE1 and the fixed part 110 at least partially overlap the openings 110*a*.

As shown in FIG. 4, the first optical element OE1 may include a first optical element surface OE1*a*, and the first optical element surface OE1*a* may face the light L. In other words, the first optical element OE1 may have a substantially flat shape, and the first optical element OE1 may be perpendicular to the light L (or perpendicular to the optical axis OA and parallel to the X-axis and the Y-axis).

The first optical element OE1 may at least partially overlap with the opening 110*a* of the fixed part 110 when the movable part 120 is located at a first position. Therefore, the first optical element OE1 may block a part of the light L to control the amount of incident light that incident into the optical system 100.

Please refer to FIG. 5. FIG. 5 is a cross-sectional view along line A-A' of FIG. 2 of the optical system 100 and the first optical element OE1 according to some embodiments of the present disclosure, in which the first optical element OE1 and the fixed part 110 do not overlap the openings 110*a*.

As shown in FIG. 5, the first optical element OE1 may not overlap with the opening 110*a* of the fixed part 110 when the movable part 120 is in a second position. Therefore, the first optical element OE1 may not block the light L, so that the light L may be completely incident into the optical system 100.

Please continue to refer to FIG. 4 and FIG. 5, the magnetic element 131 may be disposed on the movable part 120, and the driving coil 132 may be disposed on the outer frame 111 of the fixed part 110.

The magnetic element 131 may include a magnetic element surface 131*a*, and the magnetic element surface 131*a* may face the driving coil 132. In the embodiments of FIG. 4 and FIG. 5, the magnetic element surface 131*a* may face the fixed part 110.

According to some embodiments of the present disclosure, the magnetic element surface 131*a* may be parallel to the light L. In other words, the magnetic element surface 131*a* may be parallel to the traveling direction of the light L.

As shown in FIG. 4 and FIG. 5, the magnetic conductive element 133 may be provided corresponding to the magnetic element 131 to generate an attraction force AF. Moreover, in the embodiments of FIG. 4 and FIG. 5, the magnetic conductive element 133 may be disposed on the fixed part 110 so that the movable part 120 may be supported on the fixed part 110 by the attraction force AF.

It should be noted that according to some embodiments of the present disclosure, the movable part 120 may indirectly bear on the fixed part 110 through the attraction force AF, so as to avoid direct friction between the movable part 120 and the fixed part 110.

Figure 6:
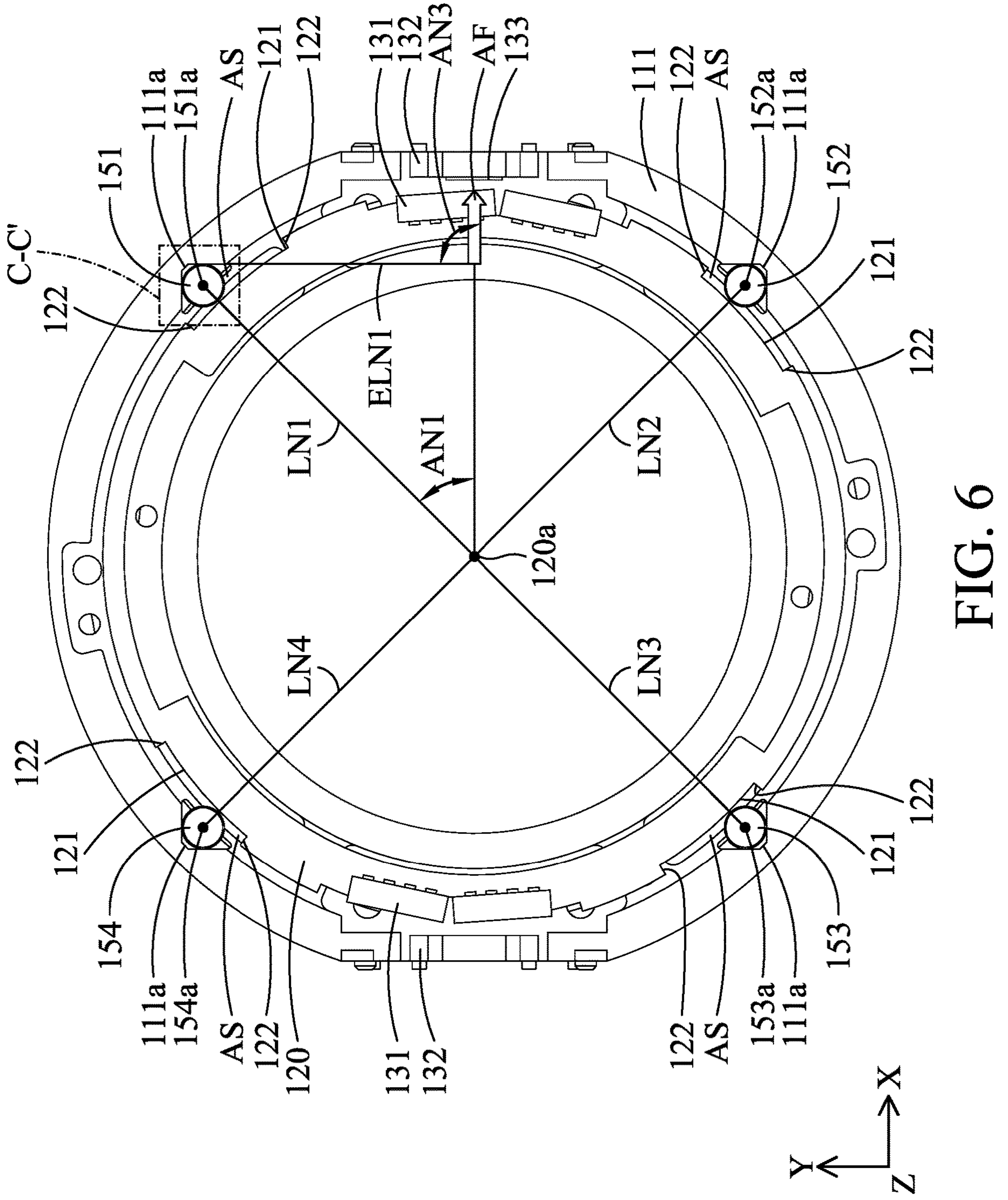
FIG. 6 is a cross-sectional view along line B-B' of FIG. 2 of the optical system and the first optical element according to some embodiments of the present disclosure.

Please refer to FIG. 6, FIG. 6 is a cross-sectional view along line B-B' of FIG. 2 of the optical system 100 and the first optical element OE1 according to some embodiments of the present disclosure.

As shown in FIG. 6, the supporting assembly 150 may include a first supporting element 151, a second supporting element 152, a third supporting element 153, and a fourth supporting element 154.

The first supporting element 151, the second supporting element 152, the third supporting element 153, and the fourth supporting element 154 may be respectively located in the four V-shaped grooves 111*a* on the outer frame 111.

According to some embodiments of the present disclosure, the first supporting element 151, the second supporting element 152, the third supporting element 153, and the fourth supporting element 154 may have a spherical shape. For example, the first supporting element 151, the second supporting element 152, the third supporting element 153, and the fourth supporting element 154 may each be a ball. That is, each of the four V-shaped grooves 111*a* on the outer frame 111 may respectively accommodates one ball.

According to some other embodiments of the present disclosure, the first supporting element 151, the second supporting element 152, the third supporting element 153, and the fourth supporting element 154 may each be two balls. That is, each of the four V-shaped grooves 111*a* on the outer frame 111 may respectively accommodates two balls.

The V-shaped groove 111*a* and a movable part outer surface 121 of movable part 120 may jointly form an accommodation space AS. The first supporting element 151, the second supporting element 152, the third supporting element 153, and the fourth supporting element 154 may be located in the four accommodation spaces AS respectively, so as to avoid the first supporting element 151, the second supporting element 152, the third supporting element 153 and the fourth supporting element 154 from moving to undesired positions.

The movable part outer surface 121 may be an arc. For example, the movable part outer surface 121 may be an arc with a movable part center 120*a* of the movable part 120 as the center. Therefore, the first supporting element 151, the second supporting element 152, the third supporting element 153, and the fourth supporting element 154 may move smoothly relative to the movable part outer surface 121.

As shown in FIG. 6, a first supporting element center 151*a* of the first supporting element 151 and the movable part center 120*a* of the movable part 120 may form a first line segment LN1; a second supporting element 152*a* of the second supporting element 152 and the movable part center 120*a* of the movable part 120 may form a second line segment LN2; a third supporting element center 153*a* of the third supporting element 153 and the movable part center 120*a* of the movable part 120 may form the third line segment LN3; a fourth supporting element center 154*a* of the fourth supporting element 154 and the movable part center 120*a* of the movable part 120 may form a fourth line segment LN4.

According to some embodiments of the present disclosure, the first line segment LN1, the second line segment LN2, the third line segment LN3, and the fourth line segment LN4 may be spaced apart by 90 degrees, respectively.

In detail, the first line segment LN1 may be spaced 90 degrees from the second line segment LN2 and the fourth line segment LN4, respectively; the second line segment LN2 may be spaced 90 degrees from the third line segment LN3; and the third line segment LN3 may be spaced 90 degrees from the fourth line segment LN4.

According to some other embodiments of the present disclosure, the first line segment LN1, the second line segment LN2, the third line segment LN3, and the fourth line segment LN4 may be spaced apart by different angles.

According to some embodiments of the present disclosure, the supporting assembly 150 may include a first supporting element 151, a second supporting element 152, and a third supporting element 153, but no fourth supporting element.

A first supporting element center 151*a* of the first supporting element 151 and the movable part center 120*a* of the movable part 120 may form a first line segment LN1; a second supporting element center 152*a* of the second supporting element 152 and the movable part center 120*a* of the movable part 120 may form a second line segment LN2; a third supporting element center 153*a* of the third supporting element 153 and the movable part center 120*a* of the movable part 120 may form a third line segment LN3.

Furthermore, the first line segment LN1 may be spaced 120 degrees apart from the second line segment LN2 and the third line segment LN3, respectively; the second line segment LN2 may be spaced 120 degrees apart from the third line segment LN3.

Alternatively, the first line segment LN1, the second line segment LN2, and the third line segment LN3 may be spaced apart by different angles.

According to some embodiments of the present disclosure, the supporting assembly 150 may include a first supporting element 151 and a second supporting element 152, but no third supporting element and no fourth supporting element.

A first supporting element center 151*a* of the first supporting element 151 and the movable part center 120*a* of the movable part 120 may form a first line segment LN1; a second supporting element center 152*a* of the second supporting element 152 and the movable part 120 The center 120*a* may form a second line segment LN2.

Furthermore, the first line segment LN1 may be spaced 180 degrees from the second line segment LN2. Alternatively, the first line segment LN1 and the second line segment LN2 may be spaced apart by different angles.

Please return to FIG. 6. The attraction force AF between the magnetic element 131 and the magnetic conductive element 133 may cause the movable part 120 to abut against the first supporting element 151 and the second supporting element 152; and this attraction force AF may make the movable part 120 presses the first supporting element 151 and the second supporting element 152 against the fixed part 110. In other words, the first supporting element 151 and the second supporting element 152 may abut against the movable part outer surface 121 of the movable part 120 and the fixed part 110.

Therefore, the movable part 120 will not move linearly relative to the fixed part 110 (for example, along the X-axis or Y-axis); however, the movable part 120 may rotate relative to the fixed part 110 (for example, around the optical axis OA).

Moreover, according to some embodiments of the present disclosure, the magnetic conductive element 133 may extend to the base 112 of the fixed part 110, so that the magnetic element 131 and the magnetic conductive element 133 may also generate a downward (−Z direction) second attraction force AF2 (may refer to FIG. 4 and FIG. 5). In this way, the movable part 120 may be effectively fixed downward, thereby preventing the movable part 120 from generating the vibration along the Z-axis.

Moreover, since the movable part 120 is against and close to the first supporting element 151 and the second supporting element 152, the center of gravity of the movable part 120 (which may be located at the movable part center 120*a* of the movable part 120) is also close to the first supporting element 151 and the second supporting element 152. When viewed with the first supporting element 151 and the second supporting element 152 as fulcrums, the center of gravity of the movable part 120 forms a smaller moment. Therefore, the movable part 120 may have stable moment distribution, making the movable part 120 more stable.

In addition, since the attraction force AF presses the movable part 120 toward the +X direction, the movable part 120 may not abut the third supporting element 153 and the fourth supporting element. In other words, there may be a gap between the movable part 120 and the third supporting element 153 and the fourth supporting element 154. Therefore, the third supporting element 153 and the fourth supporting element 154 may not abut the movable part 120 and the fixed part 110.

In this way, the movable part 120 may be avoided from generating excessive resistance (for example, friction force) caused by abutment when moving, and therefore it may facilitate the movement of the movable part 120 relative to the fixed part 110.

Please continue to refer to FIG. 6. According to some embodiments of the present disclosure, an angle AN1 between the first line segment LN1 and the attraction force AF may be greater than 30 degrees. According to some embodiments of the present disclosure, the angle AN1 between the first line segment LN1 and the attraction force AF may be greater than 45 degrees.

In this way, the attraction force AF of the movable part 120 to the fixed part 110 may be effectively dispersed, and making the optical system 100 more stable.

As shown in FIG. 6, the movable part 120 may further include a movable part stopping structure 122. The movable part stopping structure 122 may extend from the movable part outer surface 121 toward the fixed part 110.

When the movable part 120 rotates, the movable part stopping structure 122 may be in contact with the first supporting element 151, the second supporting element 152, the third supporting element 153, and the fourth supporting element 154 to limit the range of movement of the movable part 120 relative to the fixed part 110.

Figure 7:
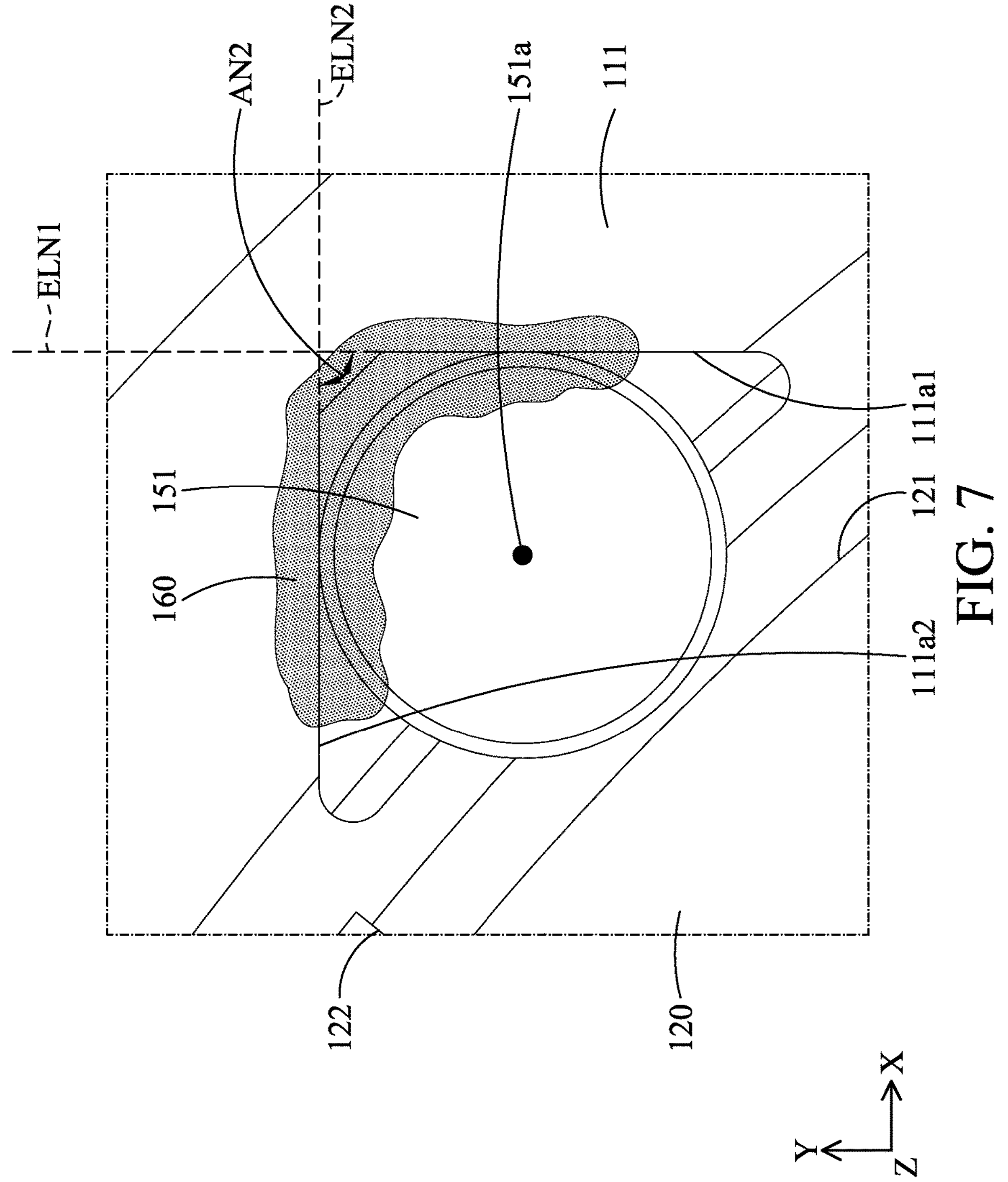
FIG. 7 is an enlarged view of the optical system and the first optical element along line C-C' of FIG. 6 according to some embodiments of the present disclosure.

Please refer to FIG. 7, FIG. 7 is an enlarged view of the optical system 100 and the first optical element OE1 along line C-C' of FIG. 6 according to some embodiments of the present disclosure.

As shown in FIG. 7, the V-shaped groove 111*a* may include a V-shaped groove first surface 111*a*1 and a V-shaped groove second surface 111*a*2. The first supporting element 151 may abut against the V-shaped groove first surface 111*a*1 and the V-shaped groove second surface 111*a*2.

The V-shaped groove first surface 111*a*1 may have an extended line segment ELN1. The extended line segment ELN1 of the V-shaped groove first surface 111*a*1 may extend beyond the V-shaped groove first surface 111*a*1 along the V-shaped groove first surface 111*a*1.

The V-shaped groove second surface 111*a*2 may have an extended line segment ELN2. The extended line segment ELN2 of the V-shaped groove second surface 111*a*2 may extend beyond the V-shaped groove second surface 111*a*2 along the V-shaped groove second surface 111*a*2.

An angle AN2 between the extended line segment ELN1 of the V-shaped groove first surface 111*a*1 and the extended line segment ELN2 of the V-shaped groove second surface 111*a*2 may be between 80 degrees and 100 degrees.

In this way, the first supporting element 151 may be accommodated more stably to prevent the first supporting element 151 from moving away from the V-shaped groove 111*a*.

Similarly, the second supporting element 152, the third supporting element 153, and the fourth supporting element 154 and their corresponding V-shaped grooves may also have similar structures and benefits.

Please return to FIG. 6. The angle AN3 between the extended line segment ELN1 of the V-shaped groove first surface 111*a*1 and the attraction force AF may be between 75 degrees and 105 degrees. In this way, the first supporting element 151 may effectively abut the V-shaped groove first surface Mal. And, therefore, the V-shaped groove first surface 111*a*1 may be called the main supporting surface of the V-shaped groove 111*a*.

Similarly, the second supporting element 152, the third supporting element 153, and the fourth supporting element 154 and their corresponding V-shaped grooves may also have similar structures and benefits.

Figure 8:
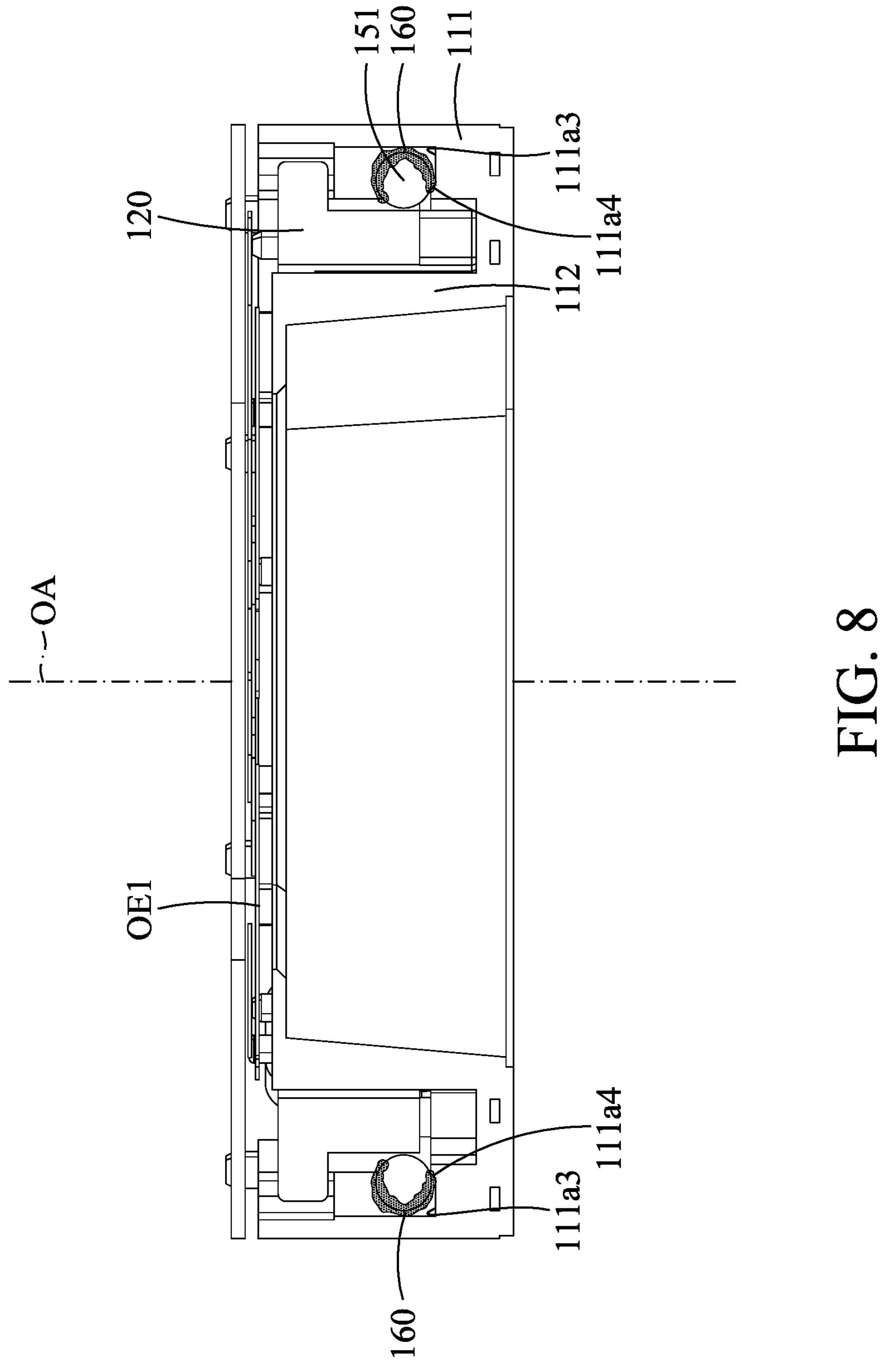
FIG. 8 is a cross-sectional view along line D-D' of FIG. 2 of the optical system and the first optical element according to some embodiments of the present disclosure.

Please refer to FIG. 8. FIG. 8 is a cross-sectional view along line D-D' of FIG. 2 of the optical system 100 and the first optical element OE1 according to some embodiments of the present disclosure.

As shown in FIG. 8, the V-shaped groove 111*a* may further include a V-shaped groove recess 111*a*3. The V-shaped groove recess 111*a*3 may be recessed downward (−Z) along the traveling direction of the light L to accommodate the first supporting element 151.

The lubricating element 160 may be disposed adjacent to the first supporting element 151, and the V-shaped groove recess 111*a*3 may accommodate the lubricating element 160. In this way, the first supporting element 151 may be effectively retained in the V-shaped groove 111*a*, and the rotation of the first supporting element 151 may be smoother.

Similarly, the second supporting element 152, the third supporting element 153, and the fourth supporting element 154 and their corresponding V-shaped grooves may also have similar structures and benefits.

As shown in FIG. 8, the V-shaped groove 111*a* may further include a bevel structure 111*a*4. The bevel structure 111*a*4 may be away from the V-shaped groove first surface 111*a*1 and the V-shaped groove second surface 111*a*2, and the bevel structure 111*a*4 may be disposed at the edge of the V-shaped groove recess 111*a*3.

Moreover, the bevel structure 111*a*4 may extend obliquely upward from the V-shaped groove recess 111*a*3. In this way, the first supporting element 151 may be prevented from moving away from the V-shaped groove 111*a*, and unwanted substances may be prevented from being generated when the first supporting element 151 hits the V-shaped groove 111*a*.

Similarly, the second supporting element 152, the third supporting element 153, and the fourth supporting element 154 and their corresponding V-shaped grooves may also have similar structures and benefits.

According to some unillustrated modified embodiments of the present disclosure, the V-shaped groove may be formed on the movable part instead of the fixed part. Moreover, the first supporting element, the second supporting element, the third supporting element, and the fourth supporting element may be disposed in an accommodation space formed by the V-shaped groove and a fixed part inner surface of the fixed part to avoid the first supporting element, the second supporting element, the third supporting element, and the fourth supporting element from moving to unwanted positions.

The fixed part inner surface of the fixed part may be an arc. For example, the inner surface of the fixed part may be an arc with a fixed part center of the fixed part as the center. Therefore, the first supporting element, the second supporting element, the third supporting element, and the fourth supporting element may move smoothly relative to the fixed part inner surface.

Similarly, the attraction force between the magnetic element and the magnetic conductive element may cause the movable part to press against the first supporting element; and this attraction force may cause the movable part to press the first supporting element against the fixed part. In other words, the first supporting element may abut against the movable part and the fixed part inner surfaces of the fixed part.

It should be understood that the different embodiments described above with respect to the supporting assembly may also be applied to the embodiments discussed now.

The included angle between the extended line segment of the V-shaped groove first surface and the extended line segment of the V-shaped groove second surface may be between 80 degrees and 100 degrees. In this way, the first supporting element may be accommodated more stably to prevent the first supporting element from moving away from the V-shaped groove.

Similarly, the second supporting element, the third supporting element, and the fourth supporting element and their corresponding V-shaped grooves may also have similar structures and benefits.

The angle between the extended line segment of the V-shaped groove first surface and the attraction force may be between 75 degrees and 105 degrees. In this way, the first supporting element may effectively abut the V-shaped groove first surface. And, therefore, the V-shaped groove first surface may be called the main supporting surface of the V-shaped groove.

Similarly, the second supporting element, the third supporting element, and the fourth supporting element and their corresponding V-shaped grooves may also have similar structures and benefits.

The fixed part may further include a fixed part stopping structure. The fixed part stopping structure may extend from the fixed part inner surface of the fixed part toward the movable part.

When the movable part rotates, the fixed part stopping structure may be in contact with the first supporting element, the second supporting element, the third supporting element, and the fourth supporting element to limit the movement range of the movable part relative to the fixed part.

According to some embodiments of the present application, the magnetic conductive element may be fixed on the fixed part. According to some embodiments of the present application, the magnetic conductive element may be in contact with the driving coil. According to some embodiments of the present application, the magnetic conductive element may be in an L shape. According to some embodiments of the present application, the magnetic conductive element may at least partially overlaps the magnetic element when viewed along the traveling direction of the light.

In general, the optical system of the embodiment of the present disclosure may make the movable part move smoothly relative to the fixed part, and may avoid unwanted movement of the movable part. Furthermore, the supporting element of the present disclosure may be stably accommodated in the V-shaped groove without moving to an unwanted position. Finally, the optical system of the embodiment of the present disclosure may be more stable and avoid torque imbalance in the movable part.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical system, comprising:

a fixed part, having an opening, wherein a light passes through the opening;

a movable part, movable relative to the fixed part and connected to a first optical element;

a driving assembly, driving the movable part to move relative to the fixed part; and a supporting assembly disposed between the fixed part and the movable part, wherein the first optical element at least partially overlaps the opening when the movable part is in a first position;

wherein the first optical element further comprises a first optical element surface, and the first optical element surface faces the light, wherein the driving assembly further comprises a magnetic conductive element corresponding to the magnetic element to generate an attraction force, wherein the supporting assembly comprises a first supporting element, and the first supporting element abuts the fixed part and the movable part, wherein the first supporting element comprises a first supporting element center, wherein the angle between the first line segment formed by the first supporting element center and a movable part center of the movable part and the attraction force is greater than 30 degrees.

2. The optical system as claimed in claim 1, wherein the first optical element does not overlap the opening when the movable part is in a second position.

3. The optical system as claimed in claim 1, wherein the driving assembly comprises a driving coil and a magnetic element, wherein a magnetic element surface of the magnetic element faces the driving coil, and the magnetic element surface is parallel to the traveling direction of the light.

4. The optical system as claimed in claim 3, wherein the magnetic conductive element is fixed on the fixed part, the magnetic conductive element is in contact with the driving coil, and the magnetic conductive element is in an L shape, wherein the magnetic conductive element at least partially overlaps the magnetic element when viewed along the traveling direction of the light.

5. The optical system as claimed in claim 1, wherein the angle between the first line segment and the attraction force is greater than 45 degrees.

6. The optical system as claimed in claim 1, wherein the first supporting element is disposed in an accommodation space formed by a V-shaped groove of the fixed part and a movable part outer surface of the movable part, wherein the movable part outer surface is an arc with a movable part center of the movable part as the center, wherein the first supporting element abuts the movable part outer surface.

7. The optical system as claimed in claim 6, wherein the movable part further comprises a movable part stopping structure extending from the movable part outer surface toward the fixed part.

8. The optical system as claimed in claim 6, wherein the V-shaped groove comprises a V-shaped groove first surface, wherein the first supporting element abuts the V-shaped groove first surface, wherein an angle between an extended line segment of the V-shaped groove first surface and the attraction force is between 75 degrees and 105 degrees.

9. The optical system as claimed in claim 8, wherein the V-shaped groove further comprises a V-shaped groove second surface, wherein the first supporting element abuts the V-shaped groove second surface, wherein an angle between the extended line segment of the V-shaped groove first surface and the extended line segment of the V-shaped groove second surface is between 80 degrees and 100 degrees.

10. The optical system as claimed in claim 9, wherein the V-shaped groove further comprises a V-shaped groove recess, the V-shaped groove recess is recessed downward along the traveling direction of the light to accommodate the first supporting element.

11. The optical system of claim 10 further comprises a lubricating element disposed adjacent to the first supporting element, wherein the V-shaped groove recess further accommodates the lubricating element.

12. The optical system as claimed in claim 10, wherein the V-shaped groove further comprises a bevel structure, wherein the bevel structure is away from the V-shaped groove first surface and the V-shaped groove second surface, and the bevel structure is disposed at the edge of the V-shaped groove recess, wherein the bevel structure extends obliquely upward from the V-shaped groove recess.

13. The optical system as claimed in claim 1, wherein the supporting assembly comprises a second supporting element, wherein a first supporting element center of the first supporting element and a movable part center of the movable part form a first line segment, wherein a second supporting element center of the second supporting element and the movable part center form a second line segment, wherein an angle between the first line segment and the second line segment is 180 degrees.

14. The optical system as claimed in claim 1, wherein the supporting assembly further comprises a second supporting element, a third supporting element, and a fourth supporting element, wherein a first supporting element center of the first supporting element and a movable part center of the movable part form a first line segment, wherein a second supporting element center of the second supporting element and the movable part center form a second line segment, wherein a third supporting element center of the third supporting element and the movable part center form a third line segment, wherein a fourth supporting element center of the fourth supporting element and the movable part center form a fourth line segment, wherein the first line segment, the second line segment, the third line segment, and the fourth line segment are spaced apart by 90 degrees, respectively.

15. The optical system as claimed in claim 14, wherein the second supporting element abuts the fixed part and the movable part, wherein the third supporting element and the fourth supporting element do not abut the fixed part and the movable part.

16. The optical system as claimed in claim 1, wherein the first supporting element is disposed in an accommodation space formed by a fixed part inner surface of the fixed part and a V-shaped groove of the movable part, wherein the fixed part inner surface is an arc with a center fixed part of the fixed part as the center, wherein the first supporting element abuts the fixed part inner surface.

17. The optical system as claimed in claim 16, wherein the V-shaped groove comprises a V-shaped groove first surface, wherein the first supporting element abuts the V-shaped groove first surface, wherein an angle between an extended line segment of the V-shaped groove first surface and the attraction force is between 75 degrees and 105 degrees.

18. The optical system as claimed in claim 17, wherein the fixed part further comprises a fixed part stopping structure extending from the fixed part inner surface toward the movable part.

* * * * *